United States Patent [19]
Kugele et al.

[11] 3,890,277
[45] June 17, 1975

[54] ALKYLTIN POLYSULFIDE THIOESTER STABILIZED COMPOSITION

[75] Inventors: Thomas G. Kugele, Cincinnati; Robert E. Bresser, Sharonville, both of Ohio

[73] Assignee: Cincinnati Milacron Chemicals Inc., Reading, Ohio

[22] Filed: Sept. 23, 1974

[21] Appl. No.: 508,713

Related U.S. Application Data

[62] Division of Ser. No. 400,127, Sept. 24, 1973, Pat. No. 3,869,487.

[52] U.S. Cl. .......................................... 260/45.75 S
[51] Int. Cl.² .......................................... C08F 45/62
[58] Field of Search ............................ 260/45.75 S

[56] References Cited
UNITED STATES PATENTS

| | | | |
|---|---|---|---|
| 2,731,440 | 1/1956 | Stefl | 260/45.75 |
| 2,731,484 | 1/1956 | Best | 260/45.75 |
| 3,413,264 | 11/1968 | Hechenbleikner | 260/45.75 |
| 3,518,223 | 6/1970 | Foth et al. | 260/45.75 |
| 3,565,930 | 2/1971 | Kauder | 260/45.75 |
| 3,565,931 | 2/1971 | Brecker | 260/45.75 |
| 3,609,120 | 9/1971 | Hoye et al. | 260/45.75 |

*Primary Examiner*—V. P. Hoke
*Attorney, Agent, or Firm*—Cushman, Darby & Cushman

[57] ABSTRACT

Compounds are prepared having the formula:

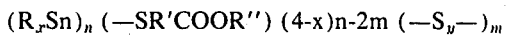

$(R_xSn)_n (-SR'COOR'')_{(4-x)n-2m} (-S_y-)_m$ where the tin is tetravalent, R is alkyl of 1 to 8 carbon atoms or benzyl, R' is alkylene of 1 to 4 carbon atoms, R'' is alkyl or alkenyl of 1 to 18 carbon atoms, cycloalkyl of 5 to 6 carbon atoms in the ring or benzyl, $x$ is 1 or 2, $y$ is 2 to 4, $n$ is 1 to 10 and $m$ is ½ $n$ to $n$. The compounds are useful as stabilizers for polyvinyl chloride and other halogen containing polymers.

15 Claims, No Drawings

ALKYLTIN POLYSULFIDE THIOESTER STABILIZED COMPOSITION

This is a division of application Ser. No. 400,127 filed Sept. 24, 1973, now U.S. Pat. No. 3,869,487.

The present invention relates to novel organotin mercaptocarboxylic acid ester polysulfides useful as stabilizers for polyvinyl chloride and other halogen containing polymers.

The novel organotin compounds have the formula

$(R_x n n(-SR'COOR'')_{(4-x)n-2m} (-S_y)_m$ where the tin is tetravalent, R is alkyl of 1 to 8 carbon atoms or benzyl, R' is alkylene of 1 to 4 carbon atoms, R'' is alkyl of 1 to 18 carbon atoms or alkenyl of 2 to 18 carbon atoms, cycloalkyl having 5 to 6 carbon atoms in the ring, or benzyl, x is 1 or 2, y is 2 to 4, n is 1 to 10 and m is ½n to n.

The R group or groups linked directly to tin can be methyl, ethyl, propyl, isopropyl, n-butyl, isobutyl, sec. butyl, t-butyl, amyl, hexyl, octyl, isooctyl, 2-ethylhexyl or benzyl for example. R' can be methylene, ethylene, propylene, trimethylene or tetramethylene for example. R'' can be methyl, ethyl, propyl, isopropyl, n-butyl, isobutyl, sec. butyl, t-butyl, amyl, hexyl, heptyl, octyl, isooctyl, 2-ethylhexyl, nonyl, decyl, isodecyl, dodecyl (lauryl), tetradecyl (myristyl), hexadecyl (palmityl), octadecyl (stearyl), vinyl, allyl, methallyl, crotyl, decenyl, hexadecenyl, oleyl, cyclopentyl, cyclohexyl, methyl-cyclohexyl. Thus —SR'COOR'' are derived from mercaptoalkanoic acid esters by removing the hydrogen atom of the mercapto group. These include esters of mercaptoacetic acid, alpha mercaptopropionic acid, beta mercaptopropionic acid, alpha mercaptobutyric acid, beta mercaptobutyric acid, gamma mercaptobutyric acid, gamma mercaptovaleric acid, alpha mercapto-valeric acid, beta mercapto valeric acid. Thus the —S R'COOR'' group can be derived from methyl mercaptoacetate (methyl thioglycolate), ethyl mercaptoacetate, propyl mercaptoacetate, butyl mercaptoacetate, isobutyl mercaptoacetate, sec. butyl mercaptoacetate, t-butyl mercaptoacetate, amyl mercaptoacetate, hexyl mercaptoacetate, octyl mercaptoacetate, isooctyl mercaptoacetate, 2-ethylhexyl mercaptoacetate, decyl mercaptoacetate, isodecyl mercaptoacetate, lauryl mercaptoacetate, myristyl mercaptoacetate, hexadecyl mercaptoacetate, stearyl mercaptoacetate, allyl mercaptoacetate, methallyl mercaptoacetate, crotyl mercaptoacetate, oleyl mercaptoacetate, cyclopentyl mercaptoacetate, cyclohexyl mercaptoacetate, 2-methylcyclohexyl mercaptoacetate, benzyl mercaptoacetate, methyl beta mercaptopropionate, ethyl beta mercaptopropionate, isopropyl beta mercaptopropionate, octyl beta mercaptopropionate, isooctyl beta mercaptopropionate, 2-ethylhexyl beta mercaptopropionate, decyl beta mercaptopropionate, octadecyl beta mercaptopropionate, allyl beta mercaptopropionate, oleyl beta mercaptopropionate, benzyl beta mercaptopropionate, cyclohexyl beta mercaptopropionate, methyl alpha mercaptopropionate, hexyl alpha mercaptopropionate, nonyl alpha mercaptopropionate, octyl alpha mercaptopropionate, isooctyl alpha mercaptopropionate, stearyl alpha mercaptopropionate, oleyl alpha mercaptopropionate, methyl alpha mercaptobutyrate, octyl alpha mercaptobutyrate, isooctyl alpha mercaptobutyrate, octadecyl alpha mercaptobutyrate, oleyl alpha mercaptobutyrate, ethyl gamma mercaptobutyrate, octyl gamma mercaptobutyrate, 2-ethylhexyl gamma mercaptobutyrate, isooctyl gamma mercaptobutyrate, benzyl gamma mercaptobutyrate, cyclopentyl gamma mercaptobutyrate, oleyl gamma mercaptobutyrate, isopropyl delta mercaptovalerate, octyl delta mercaptovalerate, isooctyl delta mercaptovalerate, octadecyl delta mercaptovalerate, oleyl delta mercaptovalerate, cyclohexyl delta mercaptovalerate and benzyl delta mercaptovalerate.

As indicated y can be 2, 3 or 4 and n an integer from 1 to 10, e.g., 1, 2, 3, 4, 5, 6, 7, 8, 9 or 10.

Examples of compounds within the invention are:

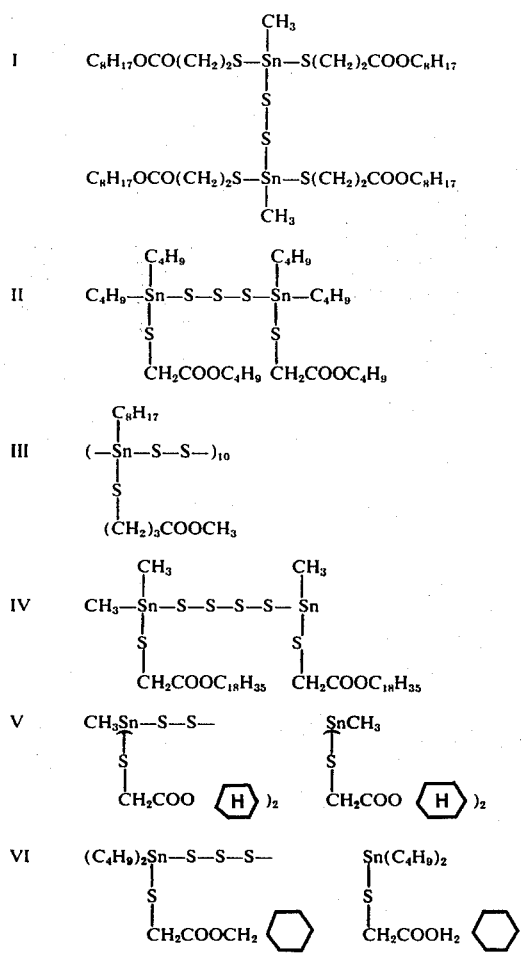

Other compounds within the invention include, for example, bis (dibenzyltin n-octylthioglycolate) disulfide, bis (diethyltin oleylthio-glycolate) tetrasulfide, bis(dimethyltin cyclohexyl beta thiopropionate, trisulfide, bis (dibutyltin benzyl delta thiovalerate) disulfide.

The compounds of the present invention can be made in various ways such as those illustrated below, for example. Thus there can be used the procedure of Kauder U.S. Pat. No. 3,565,930 or Brecker U.S. Pat. No. 3,565,931 substituting alkali metal, alkaline earth metal or ammonium polysulfide, e.g., $Na_2S_y$, $K_2S_y$, $Ca\, S_y$, $Ba\, S_y$ or $(NH_4)_2 S_y$ where y is as defined above, for the alkali metal or alkaline earth metal monosulfide of Kauder or Brecker. Thus there can be reacted 1 mol of a compound of the formula

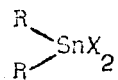

with 1 mole of a compound having the formula HSR'COOR" followed by neutralization with an alkali or alkaline earth metal hydroxide in an amount equal to the mercaptoalkanoic acid ester followed by reaction with an alkali or alkaline earth metal sulfide. If the compound

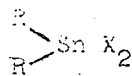

is replaced by a compound having the formula R—SnX$_3$ then there should be employed 2 mols of the mercaptoalkanoic acid ester. X can be a halogen of atomic weight 35 to 127. Thus as starting material there can be used methyltin trichloride, methyltin tribromide, methyltin triiodide, ethyltin trichloride, butyltin trichloride, butyltin tribromide, butyltin triiodide, sec. butyltin trichloride, octyltin trichloride, benzyltin dichloride, dimethyltin dichloride, dimethyltin dibromide, dimethyltin diiodide, dipropyltin dichloride, butyl methyl tin dichloride, dibutyltin dichloride, dibutyltin dibromide, dioctyltin diiodide, dioctyltin dichloride, dibenzyltin dichloride. As the mercaptoalkanoic acid ester there can be employed any of those mentioned previously.

In the Brecker patent file wrapper it is emphasized that the only suitable procedure is the one disclosed in which there is always formed a chloride containing intermediate.

In the present invention it has been found that a number of other processes can be employed as set forth hereinafter. Regardless, however, of the method employed the reaction can be carried out at a wide range of temperatures, e.g., room temperature to 100°C. usually at 25°–50°C. The reaction is usually carried out with water as a solvent, regardless of the procedure employed. There can also be employed water immiscible organic solvents, e.g. aliphatic and aromatic hydrocarbons, e.g., hexane, octane, benzene, toluene, xylene, aliphatic carboxylic acid esters, e.g., butyl acetate, propyl propionate, methyl valerate. The proportions of solvent are not critical and can vary widely.

Unless otherwise indicated all parts and percentages are by weight.

In the examples the refractive indices (R.I.) were measured at 25°C.

PROCEDURE I

This procedure follows that of Kauder and Brecker except that sodium disulfide, sodium trisulfide or sodium tetrasulfide is employed rather than sodium sulfide.

Example 1 bis (methyltin diisooctylthioglycolate) disulfide

There were charged 0.50 mole of methyltin trichloride into 200 ml of water. The mixture was cooled at 30°C. and there was added 1.0 mole of isooctyl thioglycolate. Then there was added dropwise at 30° – 40°C. 1 mole of sodium hydroxide. After this addition a solution was formed by heating 0.25 mole of sodium sulfide and 0.25 mole of sulfur in 100 ml of water and the solution was added dropwise to the mixture. After stirring for 0.5 hour at 35°C. the lower product layer was separated and washed with 200 ml of water. The product was then stripped to 100°C. under vacuum resulting in a 100% yield of a pale yellow oil. Percent sulfur 17.4 (theory 16.3%), acid value 0.6, R.I. 1.5394; Gardner color 1.

PROCEDURE II

This procedure is the same as procedure I except that ammonium hydroxide is employed as the neutralizing agent and ammonium disulfide, ammonium trisulfide or ammonium tetrasulfide is employed as the sulfide.

Example 2 bis (methyltin diisooctyl thioglycolate) disulfide

There were charged 0.50 mole of methyltin trichloride and 200 ml of water into a flask. It was cooled to 30°C. and 1.0 mole of isooctyl thioglycolate. The mixture was neutralized with 1.0 mole of ammonium hydroxide followed by the addition of 0.29 mole of ammonium disulfide solution (prepared by heating 0.29 mole of ammonium sulfide solution in 100 ml of water with 0.29 mole of sulfur) over a 15 minute period at 30°–35°C. The mixture was heated to 50°C. and the lower product layer separated from the aqueous phase. The product was washed with water and dried to 100°C. at 2 mm. Hg pressure absolute. A 100 percent yield of a pale yellow oil was obtained.

PROCEDURE III

In this procedure the sodium polysulfide (or potassium polysulfide), water, mercaptoalkanoic acid ester, hydrocarbon if desired and ammonium hydroxide are charged into a reactor and an aqueous solution of an alkyltin halide slowly added, e.g., at 25°–35°C. The mixture is then heated, e.g. to 50°C. The layers separated, and the product is washed and dried.

Example 3 bis (methyl/dimethyltin mono/diisooctylthioglycolate) disulfide

There were charged into a flask 0.219 mole of sodium disulfide, 100 grams of water, 41 grams (0.670 moles) of ammonium hydroxide solution and 0.643 moles of isooctyl thioglycolate. There were then added a mixture of 50 grams (0.624 equivalent) of methyltin trichloride and 50 grams (0.456 equivalents) of dimethyltin dichloride dissolved in 150 ml of water. The mixture was then heated to 50°C. for 0.5 hour, the layers separated, the product layer washed and dried to 100°C. under a vacuum. Yield 99.3 percent or 210.5 grams. Appearance — pale yellow oil; acid value 1.0, R.I. 1.5385; Gardner color 1. Percent sulfur 17.2 (theory 16.3).

PROCEDURE IV

In this method the mercaptoalkanoic acid ester, water, organic solvent and ammonium hydroxide are charged into a flask and then two solutions (A) alkyltin chloride and (B) alkali metal polysulfide are added simultaneously. The product is then separated, washed and stripped.

Example 4 bis(methyl/dimethyltin mono/di isooctylthioglycolate disulfide

There were charged into a flask 100 parts of water, 140 parts of heptane, 41 parts (0.670 mole) ammonium hydroxide and 136 parts of 98 percent isooctyl thioglycolate (0.642 mole). There were then added simultaneously solutions A and B. Solution A consisted of 50 grams of dimethyltin dichloride (0.225 mole) and 50 grams (0.208 mole) of methyltin trichloride, and solutions B of 0.219 moles of sodium disulfide in 100 ml of water. These solutions were added over a 0.5 hour period at 25°–35°C. The mixture was heated at 50°C. for 0.5 hour before separating, washing and stripping. Yield 99.2 percent or 210 grams. Percent sulfur (16.3 theory) 17.4; acid value 0.6; R.I. 1.5394; Gardner color 1.

PROCEDURE V

This is the same procedure as example IV except that $NaHCO_3$ is substituted in the same molar amount for the ammonium hydroxide.

Example 5 bis (methyl/dimethyltin mono/diisooctylthioglycolate) disulfide

The procedure of example 4 was repeated replacing the ammonium hydroxide by sodium bicarbonate. Yield 99.8 percent or 212.7 grams. Percent sulfur (16.55 theory), 17.7; acid value 1.5; R.I. 1.5386; Gardner color <1.

PROCEDURE VI

In this procedure the alkyltin chloride, water and ammonium hydroxide are charged into a flask and then there are added simultaneously the thioalkanoic acid ester and alkali metal polysulfide.

Example 6 bis(methyltin diisooctylthioglycolate) trisulfide

There were charged into a 1 liter flask 0.333 mole of methyltin trichloride, 100 grams of water and 0.68 mole of ammonium hydroxide. To this slurry there were added simultaneously at 25°–35°C. reagents A and B. Reagent A consisted of isooctyl thioglycolate and reagent B of 0.167 mole of sodium trisulfide in 100 ml of water. These solutions were added dropwise over a 0.5 hour period. At this point 140 grams of heptane were added and the mixture heated at 55°C. for 0.5 hour. The solution was filtered, separated and washed and stripped. Yield 97.5 percent (195.5 grams).

PROCEDURE VII

This method comprises charging the mercaptoalkanoic acid ester, water and ammonium hydroxide into a reactor and then adding an alkyltin chloride followed by an alkali metal polysulfide slowly at 30°C. After heating to 45°C. the product was separated, washed and stripped.

Example 7 bis (methyltin diisooctylthioglycolate) trisulfide

There were charged into a 1 liter flask 0.666 mole of isooctyl thioglycolate, 200 ml of water and 0.67 mole of ammonium hydroxide. Then there was added dropwise at 30°C. 0.333 mole of methyltin trichloride dissolved in 80 ml of water. At 30°C. a solution of 0.167 mole of sodium trisulfide in 100 ml of water was added dropwise and the mixture was heated to 45°C. and separated. The product was then washed and dried to give a 98.5 percent yield of a yellow oil.

PROCEDURE VIII

The method comprises charging the alkyltin chloride, water and solvent and then adding an aqueous alkali metal polysulfide solution. This is followed by the rapid addition of the thioalkanoic acid ester followed by neutralization with ammonium hydroxide. The product is then separated, washed and stripped.

Example 8 bis (methyltin diisooctylthioglycolate) trisulfide

Into a 1 liter flask there were charged 0.333 mole of methyltin trichloride, 160 ml of water and 150 ml of ethyl acetate. There were added dropwise over a 0.25 hour period at 30°C. a solution of 0.167 mole of sodium trisulfide in 100 ml of water. Then 0.666 mole of isooctyl thioglycolate was added followed by an aqueous solution containing 0.69 mole of ammonium hydroxide. The product was separated, washed and stripped to 100°C. under vacuum. Yield 201.5 grams or 100.5 percent; acid value 1.3; R.I. 1.5441; Gardner color 2.

In the following examples there were prepared the indicated compounds employing the previously identified procedures. The yields were usually between 99 and 100 percent. The column percent mono signifies the proportion of monoalkyltin trichloride used, the balance, if any, being dialkyltin dichloride in the starting alkyltin chlorides. In the columns percent sulfur and percent tin (the values in parenthesis) are theoretical values and the other values are those recorded. The amount of alkyl thioglycolate employed in each of examples 9–23 and 25–32 was 1 mole for each mole of dialkyltin dichloride and 2 moles for each mole of monoalkyltin trichloride. In example 24 there was used 1.5 moles of the alkylthioglycolate per mole of total alkyltin compounds. In examples 9–23 and 25–32 there were employed 1 mole of polysulfide for each two moles of starting alkyltin chlorides, in example 24 there was used 1.5 moles of polysulfide for each two moles of starting alkyltin chlorides.

Table 1

| Example Compound | % Mono | Method | % sulfur | % tin | R.I. | Gardner Color | Solvent |
| --- | --- | --- | --- | --- | --- | --- | --- |
| 9 bis(butyltin diisooctylthioglycolate)trisulfide | 100 | I | 17.4(17.55) | 18.3(18.6) | 1.5387 | 2 | heptane |
| 10 bis(butyltin diisooctylthioglycolate)tetrasulfide | 100 | I | 19.7(19.6) | 18.3(18.15) | 1.5458 | 2 | heptane |
| 11 bis(dioctyltin diisooctylthioglycolate)disulfide | 0 | I | | | 1.5114 | 2 | heptane |
| 12 bis(methyl/dimethyltin mono/diisooctylthioglycolate)disulfide | 25 | I | 16.6(15.6) | 25.3(26.05) | 1.5329 | <1 | heptane |
| 13 bis(methyl/dimethyltin mono/didecylthioglycolate)disulfide | 25 | I | 14.7(14.5) | 24.02(24.0) | 1.5306 | 1 | none |
| 14 bis(methyl/dimethyltin mono/diisooctylthioglycolate)trisulfide | 25 | I | | | 1.5440 | 2.5 | none |
| 15 bis(methyl/dimethyltin | 50 | I | | | 1.5504 | 2 | none |

Table 1 — Continued

| Example Compound | % Mono | Method | % sulfur | % tin | R.I. | Gardner Color | Solvent |
|---|---|---|---|---|---|---|---|
| mono/diisooctylthioglycolate)disulfide | | | | | | | |
| 16 bis(methyl/dimethyltin | 50 | VII | | | 1.5464 | 2 | none |
| mono/diisooctylthioglycolate)trisulfide | | | | | | | |
| 17 bis(methyl/dimethyltin | 50 | VII | | | 1.5482 | 2 | none |
| mono/diisooctylthioglycolate)trisulfide | | | | | | | |
| 18 bis(methyl/dimethyltin | 75 | V | 17.4(16.54) | | 1.5383 | 1 | none |
| mono/diisooctylthioglycolate)disulfide | | | | | | | |
| 19 bis(methyl/dimethyltin | 75 | III | 17.4(16.55) | | 1.5385 | <1 | heptane |
| mono/diisooctylthioglycolate)disulfide | | | | | | | |
| 20 bis(methyl/dimethyltin | 75 | V | | | 1.5392 | <1 | heptane |
| mono/diisooctylthioglycolate)disulfide | | | | | | | |
| 21 bis(methyl/dimethyltin | 75 | V | 17.2(16.55) | | 1.5338 | <1 | none |
| mono-diisooctylthioglycolate)disulfide | | | | | | | |
| 22 bis(methyl/dimethyltin | 75 | I | | | 1.5465 | 2 | none |
| mono/diisooctylthioglycolate)trisulfide | | | | | | | |
| 23 bis(methyl/dimethyltin | 75 | VII | | | 1.5470 | 2 | none |
| mono/diisooctylthioglycolate)trisulfide | | | | | | | |
| 24 bis(methyl/dimethyltin | 75 | I | | | 1.571 | 2 | none |
| mono/diisooctylmercaptopropionate trisulfide | | | | | | | |
| 25 bis(methyltin diisooctylmercaptopropionate disulfide | 100 | I | 16.8(16.0) | | 1.5348 | 1 | none |
| 26 bis(methyltin diisooctyl thioglycolate) disulfide | 100 | III | | | 1.5358 | 1 | none |
| 27 bis(methyltin diisooctyl thioglycolate) disulfide | 100 | VIII | | | 1.5358 | 1 | heptane |
| 28 bis(methyltin didecylthioglycolate) disulfide | 100 | I | | | 1.5306 | 1 | none |
| 29 bis(methyltin diisooctylthioglycolate) trisulfide | 100 | I | | | 1.5452 | 2 | none |
| 30 bis(methyltin diisooctylthioglycolate) trisulfide | 100 | VIII | 14.7(14.5) | | 1.5306 | 1 | none |
| 31 bis(methyltin diisooctylthioglycolate) trisulfide | 100 | II | | | 1.5332 | 1 | none |
| 32 methyltin diisooctylthioglycolate trisulfide | 100 | VIII | | | 1.5420 | 2 | none |

The stabilizers of the present invention can be used with halogen containing vinyl and vinylidene resins in which the halogen is attached directly to the carbon atoms. Preferably the resin is a vinyl halide resin, specifically a vinyl chloride resin. Usually, the vinyl chloride resin is made from monomers consisting of vinyl chloride alone or a mixture of monomers comprising at least 70 percent vinyl chloride by weight. When vinyl chloride copolymers are stabilized, preferably the copolymer of vinyl chloride with an ethylenically unsaturated compound copolymerizable therewith contains at least 10 percent of polymerized vinyl chloride.

As the chlorinated resin there can be employed chlorinated polyethylene having 14 to 75°, e.g. 27 percent chlorine by weight, chlorinated natural and synthetic rubber, rubber hydrochloride, chlorinated polystyrene, chlorinated polyvinyl chloride, polyvinyl chloride, polyvinylidene chloride, polyvinyl bromide, polyvinyl fluoride, copolymers of vinyl chloride with 1 to 90 percent, preferably 1 to 30 percent of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile chloroacrylonitrile, allylidene diacetate and chloroallylidene diacetate. Typical copolymers include vinyl chloride-vinyl acetate (96:4 sold commercially as VYNW), vinyl chloride-vinylacetate (87 : 13), vinyl chloride-vinyl acetate-maleic anhydride (86 : 13 : 1), vinyl chloride-vinylidene chloride (95 : 5), vinyl chloride -diethyl fumarate (95 : 5), vinyl chloride-trichloroethylene (95 : 5), vinyl chloride-2-ethylhexyl acrylate (80 : 20).

The stabilizers of the present invention can be incorporated with the resin by admixing in an appropriate mill or mixer or by any of the other well-known methods which provide for uniform distribution throughout the resin composition. Thus, mixing can be accomplished by milling on rolls at 100°–160°C.

In addition to the novel stabilizers there can also be incorporated with the resin conventional additives such as plasticizers, pigments, fillers, dyes, ultraviolet light absorbing agents, densifying agents and the like.

If the plasticizer is employed, it is used in conventional amount, e.g. 10 to 150 parts per 100 parts of resin. Typical plasticizers are di-2-ethylhexyl phthalate, dibutyl sebacate, dioctyl sebacate, tricresyl phosphate.

The tin containing stabilizers are normally used in an amount of 0.01 to 10 percent by weight of the resin, more preferably 0.2 to 5 percent of the tin compound is used by weight of the resin.

As indicated they can also be incorporated 0.1 to 10 parts per 100 parts of the halogen containing resin of a metal salt stabilizer. Thus, there can be used barium, strontium, calcium, cadmium, zinc, lead, tin, magnesium, cobalt, nickel, titanium and aluminum salts of phenols, aromatic carboxylic acids, or fatty acids of epoxy fatty acids.

Examples of suitable salts include barium di (nonylphenolate), strontium di(nonylphenolate), strontium di(amylphenolate), barium di (octylphenolate), strontium di(octylphenolate), barium di(nonyl-o-cresolate), lead di(octylphenolate), cadmium-2-ethyl-hexoate, cadmium laurate, cadmium stearate, zinc capyrylate, cadium caprate, barium stearate, barium 2-ethylhexoate, barium laurate, barium ricinoleate, lead stearate, aluminum stearate, magnesium stearate, calcium octoate, calcium stearate, cadmium naphthenate, cadmium benzoate, cadmium p-tert butylbenzoate, barium octyl salicylate, cadmium epoxy stearate, strontium epoxy stearate, cadmium salt of epoxidized acids of soybean oil, and lead epoxy stearate.

In plastisol formulations there is preferably also included from 0.1 to 10 parts per 100 parts of resin of an epoxy vegetable oil such as expoxidized soybean oil or epoxidized tall oil.

The use of the compounds of the invention as stabilizers for halogen containing resins is illustrated in Table 2 wherein the formulation was as follows:

| | | |
|---|---|---|
| PVC-450 | 100 parts | |
| Acryloid K-120 N | 1.5 | |
| TiO$_2$ | 1.5 | |
| OMYA-90T | 2.5 | |
| Calcium Stearate | 0.8 | |
| 165 Wax | 1.0 | |
| AC-629 A | 0.15 | |
| Stabilizer (calculated as tin metal) | 0.095 | |

PVC-450 is a polyvinyl chloride homopolymer. Acryloid K-120N is an acrylic processing aid which is a copolymer of 90 percent methyl methacrylate-10 percent ethyl acrylate.

OMYA-90T is a finely divided calcium carbonate filler.

AC 629A is a polyethylene lubricant.

165 Wax is a polyamide wax softening at about 165°F.

In the following table "Early Color" and "Long Term Color" are given as time (in minutes) from oven tests at 380°F. after initial milling for 5 minutes at 320°F., "Dynamics" (in minutes) is the time of continuous milling at 390°F. until catastrophic breakdown occurs, as evidenced by film failure (disintegration or sticking to the rolls). When two values are given two tests were run.

Table 2

| Tin Compound of Example | Early Color | Long Term Color | Dynamics |
|---|---|---|---|
| 1 | 20 and 30 | 30 and 40 | 18 and 17 |
| 3 | 10 | 25 | 17 |
| 4 | 10 | 25 | 15 |
| 5 | 20 | 30 | 18 |
| 6 | 5 and 25 | 35 | 17 |
| 7 | 30 | 40 | 19.2 |
| 9 | 30 | 35 | |
| 10 | 25 | 35 | |
| 12 | 15 | 30 | |
| 13 | 25 | 30 | |
| 14 | 5 | 30 | 16 |
| 15 | 10 | 30 | 12 |
| 17 | 5 | 30 | 16 |
| 18 | 20 | 30 | 17 |
| 22 | 25 | 40 | 18 |
| 23 | (5)30 | 40 | 20.7 |
| 24 | 5 | 5 | 16 |
| 25 | 30 | 40 | |
| 26 | 30 and 25 | 40 and 40 | 17 |
| 27 | 30 | 40 | |
| 28 | 15 | 30 | |
| 29 | 25 | 40 | 18 |

What is claimed is:

1. A halogen-containing polymer composition containing a compound of the formula:

$(R_xSn)_n (-SR'COOR'')_{(4-x)n-2m}(-S_y-)_m$ where the tin is tetravalent, R is alkyl of 1 to 8 carbon atoms or benzyl, R' is alkylene of 1 to 4 carbon atoms, R'' is alkyl of 1 to 18 carbon atoms, alkenyl of 2 to 18 carbon atoms, cycloalkyl having 5 to 6 carbon atoms in the ring, $x$ is 1 to 2, $y$ is 2 to 4, $n$ is 1 to 10 and $m$ is ½$n$ to $n$ in an amount effective to heat stabilize the polymer.

2. A composition according to claim 1 wherein R' is alkylene of 1 to 2 carbon atoms and n is at least 2.

3. A composition according to claim 2 wherein R'' is alkyl of 1 to 18 carbon atoms.

4. A composition according to claim 3 where $n$ is 2 and $m$ is 1.

5. A composition according to claim 1 where $n$ is 2 and $m$ is 1.

6. A composition according to claim 1 wherein $x$ is 2 and $n$ is at least 2.

7. A composition according to claim 1 where $x$ is 1 and $n$ is at least 2.

8. A composition according to claim 1 wherein in a portion of the R groups attached to the tin atoms $x$ is 1 and in the remainder of the R groups attached to the tin atoms $x$ is 2 and $n$ is at least 2.

9. A composition according to claim 1 wherein the compound is bis (methyltin dialkyl mercaptoalkanoate) polysulfide having 2 to 3 sulfur atoms in the polysulfide group and 2 to 3 carbon atoms in the mercaptoalkanoate group.

10. A composition according to claim 1 wherein the compound is bis (butyltin dialkyl mercaptoalkanoate) polysulfide having 2 to 3 sulfur atoms in the polysulfide group and 2 to 3 carbon atoms in the mercaptoalkanoate group.

11. A composition according to claim 1 wherein the compound is bis (methyl/dimethyltin mono/di alkyl mercaptoalkanoate) polysulfide having 2 to 3 sulfur atoms in the polysulfide group and 2 to 3 carbon atoms in the mercaptoalkanoate group.

12. A composition according to claim 1 wherein the compound is bis (butyl/dibutyltin mono/di alkyl mercaptoalkanoate) polysulfide having 2 to 3 sulfur atoms in the polysulfide group and 2 to 3 carbon atoms in the mercaptoalkanoate group.

13. A composition according to claim 1 wherein the compound is bis (dimethyltin alkylmercaptoalkanoate) polysulfide having 2 to 3 sulfur atoms in the polysulfide group and 2 to 3 carbon atoms in the mercaptoalkanoate group.

14. A composition according to claim 1 wherein the compound is bis (dibutyltin alkylmercaptoalkanoate) polysulfide having 2 to 3 sulfur atoms in the polysulfide group and 2 to 3 carbon atoms in the mercaptoalkanoate group.

15. A composition according to claim 1 wherein the halogen containing polymer is selected from the group consisting of vinyl chloride polymers, vinylidine chloride polymers, chlorinated polyethylene, chlorinated rubber, chlorinated polystyrene, chlorinated polyvinyl chloride and rubber hydrochloride.

* * * * *